(12) United States Patent
Willats et al.

(10) Patent No.: US 7,097,212 B2
(45) Date of Patent: Aug. 29, 2006

(54) MECHANISM

(75) Inventors: Robin Willats, Preston (GB); John Emson, West Midlands (GB); Sidney Fisher, Redditch (GB); Gurbinder Kalsi, West Midlands (GB); Nigel Spurr, Solihull (GB); Jean Didier, Anould (FR); Alan Dixon, Chester (GB); Stephen Drysdale, Northampton (GB)

(73) Assignee: ArvinMeritor Light Vehicle Systems (UK) Ltd., Birmington (GB)

( * ) Notice: Subject to any disclaimer, the term of this patent is extended or adjusted under 35 U.S.C. 154(b) by 0 days.

(21) Appl. No.: 10/158,567

(22) Filed: May 30, 2002

(65) Prior Publication Data
US 2003/0006617 A1 Jan. 9, 2003

(30) Foreign Application Priority Data
Jun. 5, 2001 (GB) .................................. 0113542.5

(51) Int. Cl.
*E05C 3/06* (2006.01)
(52) U.S. Cl. ................... 292/1; 292/137; 292/201; 292/251.5; 70/275; 70/277; 70/278.7
(58) Field of Classification Search ............... 292/1, 292/144, 201, DIG. 23, 251.5, DIG. 22, 36, 292/42, 137; 70/275, 277, 278.7
See application file for complete search history.

(56) References Cited

U.S. PATENT DOCUMENTS

| | | | | |
|---|---|---|---|---|
| 709,607 A * | 9/1902 | Podiesak | ............... | 49/2 |
| 971,423 A * | 9/1910 | Walters | ............... | 292/201 |
| 1,057,608 A * | 4/1913 | Wurmb et al. | ............... | 292/201 |
| 1,970,807 A * | 8/1934 | Lovell | ............... | 292/165 |
| 2,070,103 A * | 2/1937 | Arthur | ............... | 70/153 |
| 2,505,401 A * | 4/1950 | Ingres et al. | ............... | 180/281 |
| 2,934,930 A * | 5/1960 | Garvey | ............... | 70/264 |
| 3,090,644 A * | 5/1963 | Fiala et al. | ............... | 292/229 |
| 3,113,447 A * | 12/1963 | Oishei | ............... | 70/262 |
| 3,580,623 A * | 5/1971 | Peters | ............... | 292/201 |
| 3,593,816 A * | 7/1971 | Kazaoka | ............... | 180/281 |
| 3,596,484 A * | 8/1971 | Peters | ............... | 70/150 |
| 3,602,019 A * | 8/1971 | Kazaoka | ............... | 70/264 |
| 3,664,698 A * | 5/1972 | Stropkay | ............... | 292/201 |
| 3,726,368 A * | 4/1973 | Taylor | ............... | 188/316 |
| 3,917,327 A * | 11/1975 | Plasko | ............... | 292/1 |
| 3,971,581 A * | 7/1976 | Montgomery | ............... | 292/251.5 |
| 4,033,616 A * | 7/1977 | Sheesley | ............... | 292/216 |
| 4,169,616 A * | 10/1979 | Peterson | ............... | 292/144 |
| 4,196,924 A * | 4/1980 | Iseki | ............... | 292/79 |
| 4,541,258 A | 9/1985 | Periou et al. | | |
| 4,886,307 A * | 12/1989 | Ruckert | ............... | 292/216 |

(Continued)

FOREIGN PATENT DOCUMENTS

DE 4033162 A1 4/1991

(Continued)

OTHER PUBLICATIONS

Search Report Under Section 17 dated Sep. 26, 2001.

*Primary Examiner*—Brian E. Glessner
*Assistant Examiner*—Carlos Lugo
(74) *Attorney, Agent, or Firm*—Barnes & Thornburg LLP

(57) ABSTRACT

A mechanism for selectively locking and unlocking a vehicle door latch, comprising a rheological fluid in operable connection with an output and an input, the fluid acting so as to in a first state prevent actuation of the output upon actuation of the input and in a second state permit such actuation.

19 Claims, 3 Drawing Sheets

U.S. PATENT DOCUMENTS

| | | | |
|---|---|---|---|
| 4,913,475 A * | 4/1990 | Bushnell et al. | 292/144 |
| 4,993,747 A | 2/1991 | Borlinghaus | |
| 4,998,447 A * | 3/1991 | Feichtiger et al. | 74/502.6 |
| 5,074,389 A * | 12/1991 | Slocum | 188/277 |
| 5,177,988 A * | 1/1993 | Bushnell | 70/279.1 |
| 5,263,347 A * | 11/1993 | Allbaugh et al. | 70/257 |
| 5,263,751 A * | 11/1993 | Priest et al. | 292/336.3 |
| 5,284,330 A * | 2/1994 | Carlson et al. | 267/140.14 |
| 5,409,273 A * | 4/1995 | Claar et al. | 292/201 |
| 5,468,042 A * | 11/1995 | Heinrichs et al. | 296/146.4 |
| 5,575,515 A * | 11/1996 | Iwamoto et al. | 292/341.17 |
| 5,636,536 A * | 6/1997 | Kinnucan | 70/107 |
| 5,730,028 A * | 3/1998 | Maue et al. | 74/480 R |
| 5,799,516 A * | 9/1998 | Zintler | 70/92 |
| 5,868,445 A * | 2/1999 | Kaufman et al. | 292/251.5 |
| 5,901,991 A * | 5/1999 | Hugel et al. | 292/201 |
| 5,984,385 A * | 11/1999 | Shtarkman et al. | 292/251.5 |
| 6,027,148 A * | 2/2000 | Shoemaker | 292/216 |
| 6,279,702 B1 * | 8/2001 | Koh | 188/267.2 |
| 6,314,612 B1 * | 11/2001 | Rennecke et al. | 16/54 |
| 6,318,521 B1 * | 11/2001 | Niaura et al. | 188/267.1 |
| 6,343,494 B1 * | 2/2002 | Roos et al. | 70/264 |
| 6,416,092 B1 * | 7/2002 | Rathmann | 292/336.3 |
| 6,437,687 B1 * | 8/2002 | Spencer | 340/425.5 |
| 6,481,659 B1 * | 11/2002 | Ashtiani et al. | 242/379.1 |
| 6,514,001 B1 * | 2/2003 | Yezersky et al. | 403/109.1 |
| 2001/0048362 A1 * | 12/2001 | Spencer | |
| 2002/0148075 A1 * | 10/2002 | Monig | 16/412 |

FOREIGN PATENT DOCUMENTS

| | | |
|---|---|---|
| DE | 197 17 691 | 10/1998 |
| DE | 198 01 752 | 5/1999 |
| DE | 198 01 752 C1 | 5/1999 |
| DE | 197 54 167 | 6/1999 |
| DE | 19754167 A1 | 6/1999 |
| DE | 199 24 685 | 11/2000 |
| DE | 199 24 685 A1 | 11/2000 |
| DE | 19924685 A1 | 11/2000 |
| DE | 199 39 063 | 2/2001 |
| FR | 430732 | * 11/1990 |

* cited by examiner

MECHANISM

This application claims priority to Great Britain patent application number GB 0113542.5 filed on Jun. 5, 2001.

BACKGROUND OF THE INVENTION

The present invention relates to a vehicle locking mechanism that utilizes a rheological fluid in its operation.

Conventional locking systems require a number of moving parts whose operation may be compromised by dust ingress and wear, for example. Such locks are often relatively noisy in operation and may be relatively slow to change between locked and unlocked states. A further problem with know locking systems is that they do not interface well with electrically operated passive entry systems.

Passive entry systems replace conventional vehicle unlocking devices such as keys or "plip" type devices with sole form of transponder device that is carried by a vehicle user and that is remotely interrogated by a reader associated with the vehicle. If entry permission is granted, the system will signal the unlocking of the vehicle locks. However, as locking mechanisms are essentially mechanical in operation, one or more electrical motors must be fitted to a locking mechanism so as to convert the signals from the passive entry system to operate the locking mechanism.

SUMMARY OF THE INVENTION

The present invention seeks to overcome, or at least mitigate, the problems with the prior art.

Accordingly one aspect of the present invention provides a mechanism for selectively locking and unlocking a vehicle door latch, comprising a rheological fluid in operable connection with an output and in input, the fluid acting so as to in a first state prevent actuation of the output and in a second state permit such actuation.

A second aspect of the present invention provides a vehicle door latch comprising a locking mechanism having a rheological fluid, an output of the locking mechanism being operably connected to a door release mechanism of the latch and an input of the locking mechanism being suitable for operable connection to a door handle, the fluid acting so as to in a first state prevent actuation of the output upon actuation of the input and in a second sate permit such actuation.

BRIEF DESCRIPTION OF THE DRAWINGS

Embodiments of the present invention are now described, by way of example only, with reference to the accompanying drawings in which.

DETAILED DESCRIPTION OF THE PREFERRED EMBODIMENT

Figure 1:
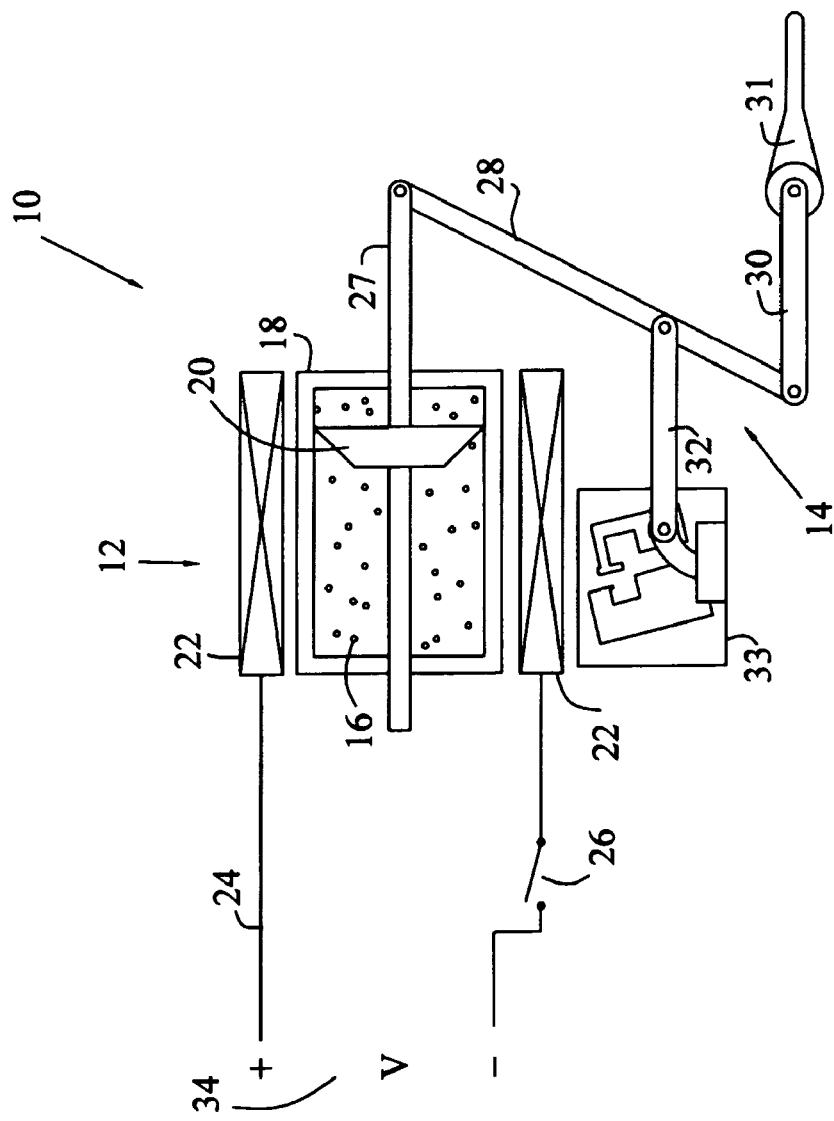
FIG. 1 is a schematic diagram of a vehicle locking mechanism according to one embodiment of the invention.

Referring to FIG. 1, there is shown generally at 10 a locking mechanism comprising a motion control device 12 and a linkage arrangement 14 mounted in a vehicle door (not shown) so as to lock the door when in a closed position relative to an associated vehicle.

The motion control device 12 comprises a cylinder 18 containing a magneto-rheological (hereinafter referred to as MR) fluid 16. A perforated piston 20 is securely mounted on a ram 27, the piston being axially slidable within cylinder 16.

In this embodiment, the piston 20 is shaped such that movement from right to left in the Figures requires less force than movement left to right. This may act to damp the return of a door handle 31 to which the mechanism is attached. In other embodiments, the piston design may be altered to reverse this, or to make the required force equal in both directions in accordance with the particular requirement of the mechanism or components with which the mechanism interacts.

The cylinder 18 is at least partially surrounded by an electromagnet 22 connected by a circuit 24 to electrical power source 34 such as the vehicle battery. A switch 26 is provided to enable the circuit to be energised, such that when the switch is closed, a magnetic field is induced in the MR fluid by the electromagnet 22. Magnetic shielding (not shown) is preferably provided to ensure that the MR fluid 16 is not influenced by external magnetic fields.

Magneto-rheological fluids are suspensions of small magnetisable particles in a liquid such as oil. MR fluids are normally free flowing and have a viscosity similar to that of motor oil. However, once a magnetic field is applied across the fluid, the fluid consistency becomes almost instantly more viscous. The increase in viscosity is proportional to the magnitude of the magnetic field applied. Electro-rheological fluids (hereinafter ER fluids) function in a similar manner upon application of a potential difference across the fluid.

In this embodiment, the linkage 14 comprises an input arm 30 which in this embodiment is connected to an internal and/or external door handle 31 of the associated vehicle door, and an output member 32 connected to an input of a latching mechanism 33 of the vehicle. Ram 27 and input arm 30 are pivotally interconnected by a connecting arm 28 at the distal ends of ram 27, arm 30 and connecting arm 28. Output arm 32 is pivotally connected to the connecting arm 28 at a position intermediate the ends of connecting arm 28.

When the locking mechanism is in a first, locked state, the potential difference is not applied to electromagnet 22. Therefore, the MR fluid is this first state has a low viscosity such that the fluid may pass through the perforations in the piston and piston 20 may move along cylinder 18 in a relatively unhindered manner.

Figure 2:
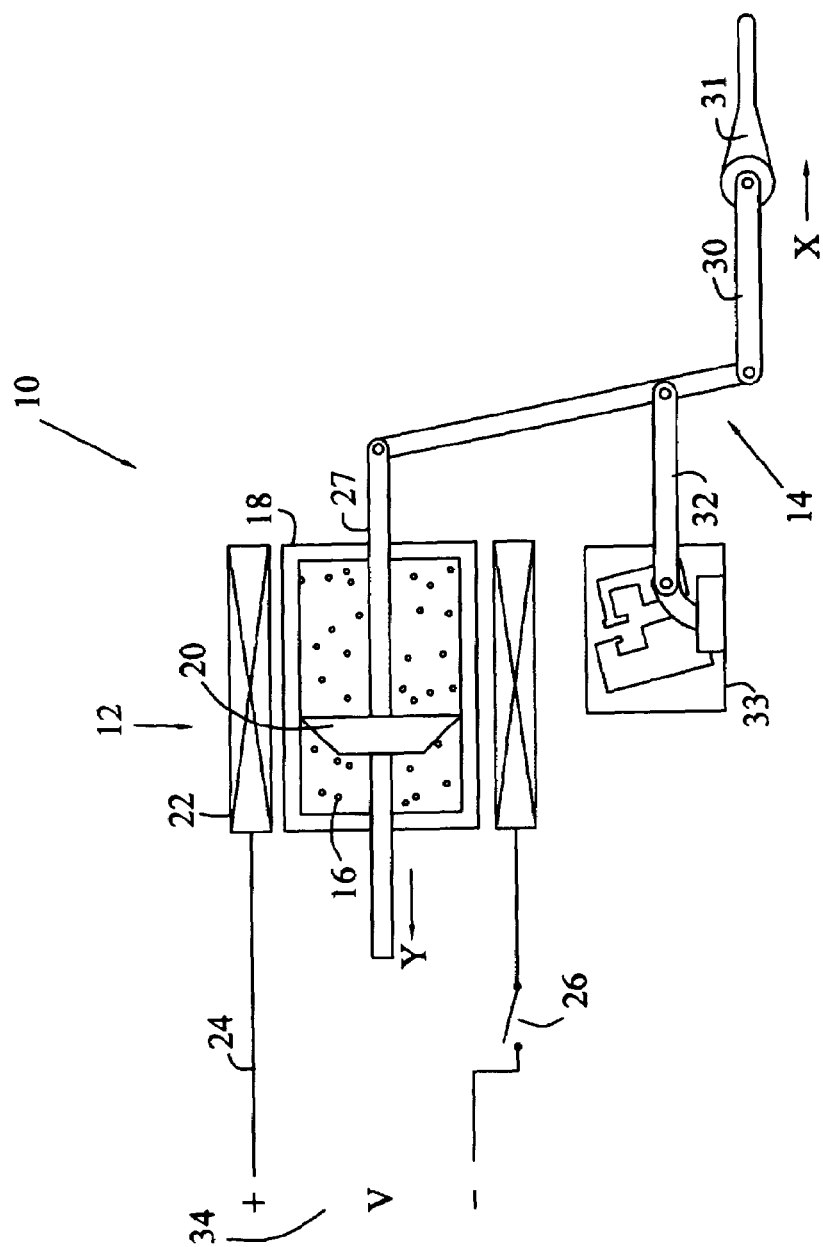
FIG. 2 illustrates the tensile operation of the mechanism of FIG. 1 when in a locked condition.

Thus, when arm 30 is caused to moved in a direction X shown in FIG. 2 by operation of the handle 31 connected thereto, the force required to displace the piston 20 is lower than the force required to cause arm 32 to unlatch the latching mechanism 33. Movement of arm 30 in a direction X merely causes a corresponding movement of piston 20 and ram 27 in the direction Y, with substantially no movement of arm 32, resulting in the latching mechanism 33 remaining latched.

Figure 3:
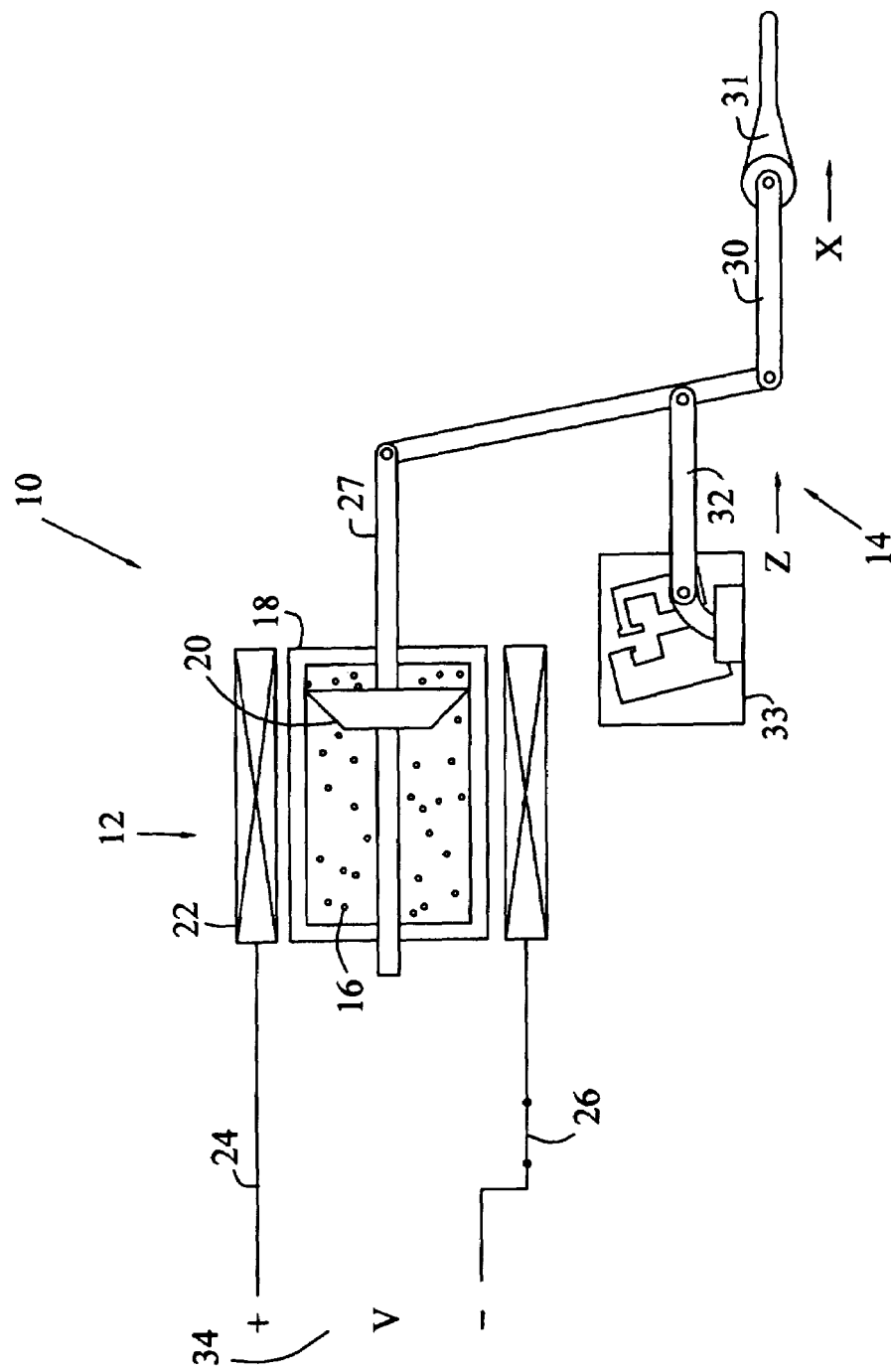
FIG. 3 illustrates the mechanism of FIG. 1 in an unlocked condition.

Referring now to FIG. 3, it can be seen that switch 26 is now closed, thus energising the electromagnet 22. This causes the viscosity of MR fluid 16 to increase so that movement of arm 30 by the door handle 31 in the direction X in turn causes arm 32 to move in a direction Z because in this second unlocked state, the force required to unlatch the latching system 33 is lower than the force required to displace the piston 20.

It is therefore apparent that the locking mechanism of the present invention requires fewer moving parts than prior art devices, and is particularly suited to use with passive/keyless entry systems that are by their very nature electrically controlled. For this reason, the locking mechanism of the present invention may be easily integrated into such a passive entry system by causing switch 26 to be under its control. If the passive entry system determines that a particular person should be permitted entry to the vehicle switch 26 is closed. Otherwise, switch 26 remains open and the door remains locked. A particular advantage of this arrangement is that the locking mechanism consumes no power when in the locked state.

Vehicle door latches, typically have a number of operating modes. For a latch having an override unlocking function, these may include locked (when pulling on an outside door handle will not release the latch but pulling on an inside handle may override the locked state, superlocked (when pulling on both the inside and outside handle will not release the door) and child safety (in which the latch can be unlocked by the inside door handle but not released). To provide these modes, latches may comprise separate mechanisms of the present invention in the transmission path from the inside and outside door handles. The mechanisms may be individually controlled by a controller to provide the above described modes as appropriate.

It should be understood that numerous changes may be made within the scope of the present invention. In particular, it should be understood that the linkage described is for illustrative purposes only, and that the mechanism may be altered as required. In alternative embodiments, an ER fluid may be used rather than an MR fluid. Furthermore, appropriate alterations may be made to the electrical circuit 24 and/or the design of the cylinder and piston so that the mechanism may be adjusted to take into account changes in the viscosity of the fluid used and in the unlatching load of a particular latch mechanism. In particular, the resistance displacement of the piston may be adjusted to provide differing resistance in either direction of travel as required for the overall function of the mechanism. The mechanism may be fitted to a door surround portion of a vehicle rather than the door itself. It should be apparent that the mechanism may have applications in other fields such as locking mechanisms in buildings.

The foregoing description is only exemplary of the principles of the invention. Many modifications and variations of the present invention are possible in light of the above teachings. The preferred examples of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A door latch comprising a locking mechanism for selectively locking and unlocking the door latch, the locking mechanism comprising an input for operable connection to a door handle, a rheological fluid held within a cylinder, the fluid having a first state in which the fluid has a first viscosity and a second state in which the fluid has a second viscosity, the second viscosity being higher than the first viscosity, and an output operably connected to a release mechanism of the latch, the fluid acting so as to in the first state prevent actuation of the output and the release mechanism upon actuation of the input and in the second state permit actuation of the output and the release mechanism upon actuation of the input, the locking mechanism further comprising a piston slidably disposed in the cylinder, a ram connected to the piston, and a connecting arm pivotally interconnecting the ram, the input, and the output.

2. The latch according to claim 1 wherein the fluid is a magneto-rheological fluid.

3. The latch according to claim 2 wherein the magnetic field is applied across the fluid in the second state and substantially no magnetic field is applied across the fluid in the first state.

4. The latch according to claim 1 wherein the fluid is an electro-rheological fluid.

5. The latch according to claim 4 wherein a potential difference is applied across the fluid in the second state and substantially no potential difference is applied across the fluid in the first state.

6. The vehicle door latch according to claim 1 wherein the piston is tapered such that resistance to movement of the piston in a first direction is greater than resistance to movement of the piston in a second direction.

7. The latch according to claim 1 wherein the input is connected to a handle associated with a door.

8. The latch according to claim 1 wherein the locking mechanism is locked when the fluid is in the first state and unlocked when the fluid is in the second state.

9. The latch according to claim 1 wherein the release mechanism is prevented from moving between latched and unlatched positions upon actuation of the input when the fluid is in the first state and is permitted to move between the latched and unlatched positions upon actuation of the input when the fluid is in the second state.

10. A keyless entry system comprising a locking mechanism for selectively locking and unlocking a vehicle door latch comprising an input connected to a handle suitable for operable connection a vehicle door, a rheological fluid, and an output operably connected to a door release mechanism of the latch, said fluid held within a cylinder and acting so as to in a first state prevent actuation of the output and the door release mechanism upon actuation of the input and in a second state permit actuation of the output and the door release mechanism upon actuation of the input, wherein the cylinder is at least partially surrounded by one or more objects capable of indacing at least one of a magnetic field and an electric field in said fluid, and the locking mechanism further comprises a piston slidably disposed in the cylinder, a ram connected to the piston, and a connecting arm pivotally interconnecting the ram, the input, and the output.

11. The keyless entry system according to claim 10 wherein the door release mechanism is prevented from moving between latched and unlatched positions upon actuation of the input by the handle when the fluid is in the first state and is permitted to move between the latched and unlatched positions upon actuation of the input by the handle when the fluid is in the second state.

12. The latch according to claim 10 wherein:

the connecting arm comprises a first end and a second end apposite to the first end, the input comprises an input arm pivotally connected to the first end, the ram is pivotally connected to the second end, the output comprises an output arm pivotally connected to the connecting arm at a position between the first end and the second end, when the fluid is in the first state, the piston and the rain are axially movable in the cylinder to allow pivotable movement of the connecting arm relative to the output arm without causing movement of the output arm upon movement of the input arm, and when the fluid is in the second state, the piston and the ram are prevented from moving axially in the cylinder to allow pivotable movement of the connecting arm and the output arm relative to the rain upon movement of the input arm.

13. A vehicle door latch comprising a locking mechanism comprising an input suitable for operable connection to a door handle, a rheological fluid, and an output operably connected to a door release mechanism of the latch, said fluid held within a cylinder and acting so as to in a first state prevent actuation of the output and the door release mechanism upon actuation of the input and in a second state permit such actuation of the output and the door release mechanism upon actuation of the input, the cylinder at least partially surrounded by one or more objects capable of inducing at least one of a magnetic field and an electric field in said fluid, the locking mechanism further comprising a piston slidably disposed in the cylinder, a rain connected to the piston and movable in the cylinder to drive the piston, and a connecting arm pivotally interconnecting the rain, the input, and the output.

14. The vehicle door latch according to claim 13 wherein the door release mechanism is prevented from moving between latched and unlatched positions upon actuation of the input when the fluid is in the first state and is permitted to move between the latched and unlatched positions upon actuation of the input when the fluid is in the second state.

15. The latch according to claim 13 wherein the connecting arm comprises a first end and a second end opposite to the first end, the input comprises an input arm pivotally connected to the first end, the ram is pivotally connected to the second end, and the output comprises an output arm pivotally connected to the connecting arm at a position between the first end and the second end.

16. The latch according to claim 15 wherein, when the fluid is in the first state, the piston and the ram are axially movable in the cylinder to allow pivotable movement of the connecting arm relative to the output arm without causing movement of the output arm upon movement of the input arm, and when the fluid is in the second state, the piston and the rain are prevented from moving axially in the cylinder to allow pivotable movement of the connecting arm and the output arm relative to the ram upon movement of the input arm.

17. A door latch comprising a locking mechanism for selectively locking and unlocking the door latch, the locking mechanism comprising an input for operable connection to a door handle, a rheological fluid held within a cylinder, the fluid having a first state in which the fluid has a first viscosity and in a second state in which the fluid has a second viscosity, the second viscosity being higher than the first viscosity, and an output operably connected to a release mechanism of the latch the fluid acting so as to in the first state prevent actuation of the output and the release mechanism upon actuation of the input and in the second state permit actuation of the output and the release mechanism upon actuation of the input, the locking mechanism further comprising a piston slidably disposed in the cylinder, a ram connected to the piston, and a connecting arm pivotally interconnecting the ran, the input, and the output, wherein, when the fluid is in the first state, the piston and the ram are axially movable in the cylinder to allow pivotable movement of the connecting arm relative to the output without causing movement of the output upon movement of the input, and, when the fluid is in the second state, the piston and the ram are prevented from moving axially in the cylinder to allow pivotable movement of the connecting arm and the output relative to the ram upon movement of the input.

18. A door latch comprising a locking mechanism for selectively locking and unlocking the door latch, the locking mechanism comprising an input for operable connection to a door handle, a rheological fluid held within a cylinder, and an output operably connected to a release mechanism of the latch the fluid acting so as to in a first state prevent actuation of the output and the release mechanism upon actuation of the input and in a second state permit actuation of the output and the release mechanism upon actuation of the input, the locking mechanism further comprising a piston slidably disposed in the cylinder, a ram connected to the piston, and a connecting arm pivotally interconnecting the ram, the input, and the output, wherein the connecting arm comprises a first end and a second end opposite to the first end, the input comprises an input arm pivotally connected to the first end, the ram is pivotally connected to the second end, and the output comprises an output arm pivotally connected to the connecting arm at a position between the first end and the second end.

19. The latch according to claim 18 wherein the input arm comprises an end pivotally connected to the first end of the connecting arm, and the output arm comprises an end pivotally connected to the connecting arm at the position between the first and second ends of the connecting arm.

\* \* \* \* \*